US011171987B2

(12) United States Patent
Guri et al.

(10) Patent No.: US 11,171,987 B2
(45) Date of Patent: Nov. 9, 2021

(54) PROTECTING COMPUTING DEVICES FROM A MALICIOUS PROCESS BY EXPOSING FALSE INFORMATION

(71) Applicant: Morphisec Information Security 2014 Ltd., Beer-Sheva (IL)

(72) Inventors: Mordechai Guri, Nof Ayalon (IL); Ronen Yehoshua, Matan (IL); Michael Gorelik, Brookline, MA (US)

(73) Assignee: Morphisec Information Security 2014 Ltd., Beer Sheva (IL)

( * ) Notice: Subject to any disclaimer, the term of this patent is extended or adjusted under 35 U.S.C. 154(b) by 300 days.

(21) Appl. No.: 16/476,938

(22) PCT Filed: Dec. 28, 2017

(86) PCT No.: PCT/IB2017/058483
§ 371 (c)(1),
(2) Date: Jul. 10, 2019

(87) PCT Pub. No.: WO2018/130903
PCT Pub. Date: Jul. 19, 2018

(65) Prior Publication Data
US 2019/0334949 A1     Oct. 31, 2019

Related U.S. Application Data

(60) Provisional application No. 62/445,020, filed on Jan. 11, 2017.

(51) Int. Cl.
*H04L 29/06*     (2006.01)

(52) U.S. Cl.
CPC ........ *H04L 63/1491* (2013.01); *H04L 63/145* (2013.01); *H04L 63/1416* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 7,228,563 B2 * | 6/2007 | Szor | ........................ | G06F 21/52 709/216 |
| 8,925,090 B2 * | 12/2014 | Kc | ........................ | G06F 21/566 726/24 |

(Continued)

FOREIGN PATENT DOCUMENTS

| | | |
|---|---|---|
| EP | 3568790 A1 | 11/2019 |
| WO | 2018130903 A1 | 7/2018 |

OTHER PUBLICATIONS

International Preliminary Report on Patentability received for PCT Patent Application No. PCT/IB2017/058483, dated Jul. 25, 2019, 9 pages.

(Continued)

*Primary Examiner* — Joseph P Hirl
*Assistant Examiner* — Hassan Saadoun
(74) *Attorney, Agent, or Firm* — Fiala & Weaver P.L.L.C.

(57) ABSTRACT

Various automated techniques are described herein for protecting computing devices from malicious code injection and execution by providing a malicious process with incorrect information regarding the type and/or version and/or other characteristics of the operating system and/or the targeted program and/or the targeted computing device. The falsified information tricks the malicious process into injecting shellcode that is incompatible with the targeted operating system, program and/or computing device. When the incompatible, injected shellcode attempts to execute, it fails as a result of the incompatibility, thereby protecting the computing device.

20 Claims, 6 Drawing Sheets

(56) References Cited

U.S. PATENT DOCUMENTS

| | | | |
|---|---|---|---|
| 2006/0242704 A1 | 10/2006 | Aviani et al. | |
| 2007/0016948 A1* | 1/2007 | Dubrovsky | H04L 67/02 726/22 |
| 2009/0055927 A1 | 2/2009 | Narasimhan et al. | |
| 2011/0191848 A1* | 8/2011 | Zorn | G06F 11/00 726/22 |
| 2012/0255013 A1* | 10/2012 | Sallam | G06F 21/564 726/24 |
| 2017/0177314 A1* | 6/2017 | Powers | G06F 9/44568 |
| 2017/0206357 A1* | 7/2017 | Gorelik | G06F 21/52 |

OTHER PUBLICATIONS

Kanich, et al., "Putting Out a HIT: Crowdsourcing Malware Installs", Jun. 24, 2011, pp. 1-10.

Murphy, et al., "An Application of Deception in Cyberspace: Operating System Obfuscation1", Department of Electrical and Computer Engineering, Apr. 1, 2010, 10 Pages.

International Search Report and Written Opinion received for PCT Patent Application No. PCT/IB2017/058483, dated Mar. 5, 2018, 13 pages.

* cited by examiner

PROTECTING COMPUTING DEVICES FROM A MALICIOUS PROCESS BY EXPOSING FALSE INFORMATION

CROSS REFERENCE TO RELATED APPLICATION

This application is a U.S. national phase application of PCT/IB2017/058483, filed on Dec. 28, 2017, which claims priority to U.S. Provisional Application Ser. No. 62/445,020, filed Jan. 11, 2017 (both entitled "Protecting Computing Devices from a Malicious Process By Exposing False Information"), the entireties of which are incorporated by reference herein.

BACKGROUND

Technical Field

Embodiments described herein generally relate to protecting computing devices from malicious code injection and/or execution.

Description of Related Art

Malicious code injection has become a major cybersecurity problem over the last few years. Using the vulnerabilities of an operating system, a service process or an application program, an attacker may exploit the vulnerability and inject malicious shellcode into a running computing process (or "process"). The shellcode, when executed, starts a command shell from which an attacker can control the computer on which the process is running Such injection can be carried out either by a remote device or by the targeted computing device itself.

BRIEF SUMMARY

Methods, systems, and apparatuses are described for protecting computing devices from malicious code injection and/or execution, substantially as shown in and/or described herein in connection with at least one of the figures, as set forth more completely in the claims.

BRIEF DESCRIPTION OF THE DRAWINGS

The accompanying drawings, which are incorporated herein and form part of the specification, illustrate embodiments of the present invention and, together with the description, further serve to explain the principles involved and to enable a person skilled in the relevant art(s) to make and use the disclosed technologies.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Numerous exemplary embodiments are now described. The section/subsection headings utilized herein are not intended to be limiting. Embodiments are described throughout this document, and any type of embodiment may be included under any section/subsection. Furthermore, it is contemplated that the disclosed embodiments may be combined with each other in any manner.

II. Example Embodiments

Techniques are described herein that protect computing devices from malicious code injection and/or execution by providing a malicious process with incorrect information regarding a type and/or version and/or other characteristics of the operating system, the targeted program, and/or the targeted computing device, in a manner that would cause the injected shellcode to fail due to an exception raised by incompatible code.

In particular, a method for protecting a computing device from shellcode injection and execution is described herein. In accordance with the method, a query that requests information about at least one of an operating system or a first computing process executing on the computing device is detected, the query being issued from a second computing device. The information about the at least one of the operating system or the first computing process is falsified. The falsified information is provided to the second computing process, wherein the falsified information causes execution of a shellcode to fail, the shellcode comprising code that has been injected into the first computing process and that is associated with the second computing process.

In accordance with one or more embodiments, the information comprises at least one of a type of the at least one of the operating system or the first computing process a version of the at least one of the operating system or the first computing process, or an identifier of the at least one of the operating system or the first computing process.

In accordance with one or more embodiments, the second computing process comprises at least one of a malicious website, a network scanner, or a malicious macro.

In accordance with one or more embodiments, the detecting step comprises hooking a procedure call issued from the second computing process that requests the information.

In accordance with one or more embodiments, execution of the shellcode causes an exception to be thrown by the first computing device.

In accordance with one or more embodiments, the method further comprises determining that a malicious attack has occurred in response to detecting the exception and performing an action to neutralize the shellcode.

In accordance with one or more embodiments, the performing step comprises terminating the shellcode, suspending the shellcode, activating an anti-virus program, recording to an event log an event that indicates that the shellcode attempted execution, or prompting a user of the computing device to specify an operation to perform.

A system is also described herein. The system includes one or more processors and a memory coupled to the one or more processors, the memory storing instructions, which, when executed by one or more processors, cause the one or more processors to perform operations. In accordance with the operations, a query that requests information about at least one of an operating system or a first computing process executing on the computing device is detected, the query being issued from a second computing device. The information about the at least one of the operating system or the first computing process is falsified. The falsified information is provided to the second computing process, wherein the falsified information causes execution of a shellcode to fail, the shellcode comprising code that has been injected into the first computing process and that is associated with the second computing process.

In accordance with one or more embodiments, the information comprises at least one of a type of the at least one of the operating system or the first computing process a version of the at least one of the operating system or the first computing process, or an identifier of the at least one of the operating system or the first computing process.

In accordance with one or more embodiments, the second computing process comprises at least one of a malicious website, a network scanner, or a malicious macro.

In accordance with one or more embodiments, the detecting step comprises hooking a procedure call issued from the second computing process that requests the information.

In accordance with one or more embodiments, execution of the shellcode causes an exception to be thrown by the first computing device.

In accordance with one or more embodiments, the operations further comprise determining that a malicious attack has occurred in response to detecting the exception and performing an action to neutralize the shellcode.

In accordance with one or more embodiments, the performing step comprises terminating the shellcode, suspending the shellcode, activating an anti-virus program, recording to an event log an event that indicates that the shellcode attempted execution, or prompting a user of the computing device to specify an operation to perform.

A computer-readable storage medium having program instructions recorded thereon that, when executed by a processing device, perform a method for protecting a computing device from shellcode injection and execution is further described herein. In accordance with the method, a query that requests information about at least one of an operating system or a first computing process executing on the computing device is detected, the query being issued from a second computing device. The information about the at least one of the operating system or the first computing process is falsified. The falsified information is provided to the second computing process, wherein the falsified information causes execution of a shellcode to fail, the shellcode comprising code that has been injected into the first computing process and that is associated with the second computing process.

In accordance with one or more embodiments, the information comprises at least one of a type of the at least one of the operating system or the first computing process a version of the at least one of the operating system or the first computing process, or an identifier of the at least one of the operating system or the first computing process.

In accordance with one or more embodiments, the second computing process comprises at least one of a malicious website, a network scanner, or a malicious macro.

In accordance with one or more embodiments, the detecting step comprises hooking a procedure call issued from the second computing process that requests the information.

In accordance with one or more embodiments, execution of the shellcode causes an exception to be thrown by the first computing device.

In accordance with one or more embodiments, the method further comprises determining that a malicious attack has occurred in response to detecting the exception, and performing an action to neutralize the shellcode.

III. Example Systems and Methods for Protecting Computing Devices from a Malicious Process by Exposing Fictitious Information Various automated techniques are described herein for protecting computing devices from malicious code injection and/or execution by providing a malicious process with incorrect information regarding a type, a version, and/or other characteristics of an operating system, a targeted program, and/or the targeted computing device. The falsified information tricks the malicious process into injected shellcode that is incompatible with the targeted OS, program, and/or computing device. When the incompatible, injected shellcode attempts to execute, it fails because of the incompatibility.

For the sake of brevity, embodiments described herein are described in terms of the Microsoft Windows® Operating System (OS), published by Microsoft Corporation of Redmond, Wash. However, as should be clear to any person skilled in the art, this is just one possible embodiment. Similar embodiments may be implemented on practically all kinds of modern operating systems, including LINUX® and other UNIX® variants, and protect such operating systems (and processes running thereon) against a very wide array of malicious-code attacks, whether such attacks are launched remotely or locally.

Figure 1:
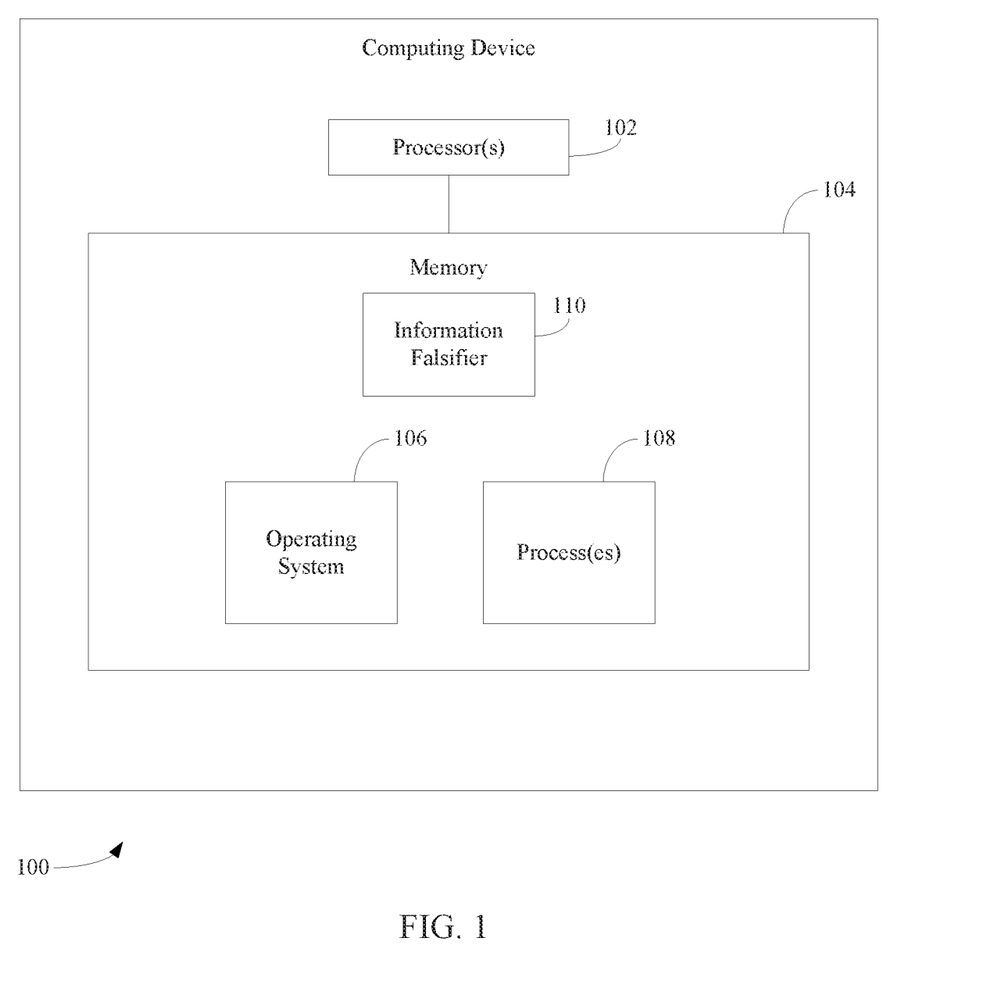
FIG. 1 depicts a block diagram of an example computing device in accordance with an embodiment.

For instance, FIG. 1 shows a block diagram of an example computing device 100, according to an example embodiment. Computing device 100 may be any type of stationary or mobile computing device, including a desktop computer (e.g., a personal computer, etc.), a mobile computer or computing device (e.g., a Palm® device, a RIM Blackberry® device, a personal digital assistant (PDA), a laptop computer, a notebook computer, a tablet computer (e.g., an Apple iPad™), a smart phone (e.g., an Apple iPhone, a Google Android™ phone, a Microsoft Windows® phone, etc.), a wearable computing device, an Internet of Things (IoT) computing device, or other type of computing device. However, these examples are not intended to be limiting and computing device 100 may include other types of devices other than those listed herein.

As further shown in FIG. 1, computing device 100 comprises one or more processors 102 and a memory 104. Processor(s) 102 are intended to represent one or more microprocessors, each of which may have one or more central processing units (CPUs) or microprocessor cores. Processor(s) 102 comprise hardware components that operate in a well-known manner to execute computer programs (also referred to herein as computer program logic). The execution of such computer programs causes processor(s) 102 to perform operations including operations that will be described herein.

Memory 104 comprises one or more computer-readable memory devices that operate to store computer programs and data. Memory 104 may be implemented using any of a wide variety of hardware-based, volatile computer-readable memory devices including, but not limited to, random access memory (RAM) devices and/or non-volatile computer-readable memory devices, including but not limited to, read-only memory (ROM) devices, solid state drives, hard disk drives, magnetic storage media such as magnetic disks and associated drives, optical storage media such as optical disks and associated drives, and flash memory devices such as USB flash drives. Processor(s) 102 are connected to memory 104 via one or more suitable interfaces.

As shown further shown in FIG. 1, memory 104 stores an operating system 106. Operating system 106 may manage one or more hardware components (e.g., processor(s) 102, memory 104, etc.) and/or software components (e.g., one or more processes 108 installed and/or executing on computing device 100. Example hardware components of computing device 100 are described in detail below in reference to FIG. 7.

Process(es) 108 may each be an instance of a computer program being executed by processor(s) 102 (as shown in FIG. 1). The computer program may comprise an application program (or "application"), a system program (e.g., a process and/or service managed by operating system 106), or other computer program being executed by processor(s) 102.

Computing device 100 is configured to protect itself from malicious code injection-based attacks. Malicious code injection may be performed by a remote process or by a local process. One example of a remote process that may perform malicious code injection is a malicious website. When a browser process (e.g., process(es) 108) executing on computing device 100 accesses such a website, the browser process typically provides the website information regarding its type, version and/or other information, along with the type and/or version of operating system 106 and/or other characteristics of computing device 100. By way of example only, such information may be included in a User-Agent header of a hypertext transfer protocol (HTTP) request provided to the website. The malicious website may use this information to determine one or more vulnerabilities of the browser process and/or operating system 106 and inject shellcode into the browser process.

Another example of a remote process that may perform malicious code injection is a network scanning process (e.g., a port scanner), which scans a registry of operating system 106 to determine a type and/or version of operating system 106 and determine one or more services (e.g., network services provided by operating system 106) that are listening for traffic on opened ports of computing device 106. Once an attacker determines this information based on the network scanning process, the attacker may determine vulnerabilit(ies) of operating system 106 and/or the service and may inject shellcode into the service's process.

An example of a local process that may perform malicious code injection is a computer application (e.g., process(es) 108) executing on computing device 106. In a particular example, the computer application may be a reader process that is configured to open, view, create, manipulate, print and/or manage one or more documents stored in memory 104. The computer application may be installed by a user of computing device 100. When the computer application opens a document containing malicious code (e.g., a macro virus), the malicious code may determine a type and/or version of operating system 106, along with a type and/or version of the computer application and/or other characteristics of computing device 100. Using this information, the malicious code may determine vulnerability(ies) of operating system 106 and/or the computer application and inject shellcode into the reader process.

To prevent injected shellcode from successfully executing on computing system 100 (whether such shellcode has been injected by a remote process or a local process), computing system 100 may include an information falsifier 110, which executes in memory 104. Information falsifier 110 may be configured to falsify the information provided to a malicious process. In particular, information falsifier 110 may provide an inaccurate type, version, and/or other identifier(s) of operating system 106 and/or process(es) 108 to the malicious process. By doing so, the shellcode installed on computing device 100 will be incompatible with operating system 106 and/or process(es) 108. Consequently, when the shellcode attempts to execute within the process in which it is injected, the execution will fail, and various steps may then be carried out to neutralize the shellcode. Neutralization of the shellcode may include steps to terminate or suspend the malicious process, steps to mitigate the effects of the malicious process, and/or steps to facilitate the termination, suspension and/or mitigation of the malicious process (such as detecting the malicious process). For example, information falsifier 110 may cause operating system 106 to terminate the shellcode, suspend the shellcode, activate an antivirus program or other security mechanisms, write event logs, prompt the user to indicate what operation to perform, etc.

Figure 2:
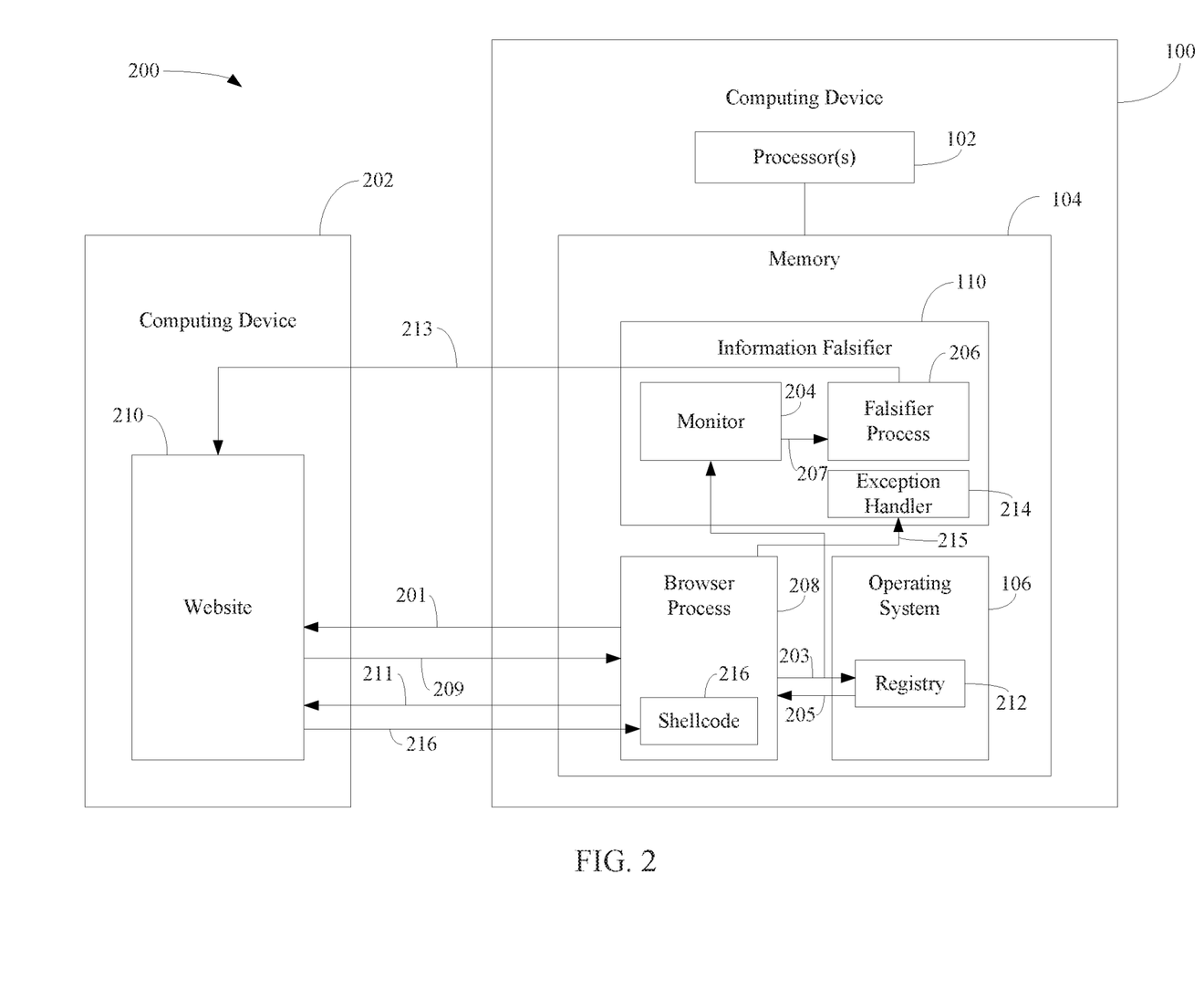
FIG. 2 shows a block diagram of an example system for falsifying information provided to a malicious website in accordance with an embodiment.

FIG. 2 shows a block diagram of an example system 200 for falsifying information provided to a malicious website, according to an example embodiment. As shown in FIG. 2, system 200 comprises computing device 100 (as described above with reference to FIG. 1) and a computing device 202. Computing device 202 may be any type of stationary or mobile computing device, including a server (e.g., a web server), desktop computer (e.g., a personal computer, etc.), a mobile computer or computing device (e.g., a Palm® device, a RIM Blackberry® device, a personal digital assistant (PDA), a laptop computer, a notebook computer, a tablet computer (e.g., an Apple iPad™), a smart phone (e.g., an Apple iPhone, a Google Android™ phone, a Microsoft Windows® phone, etc.), a wearable computing device, an IoT computing device, or other type of computing device. However, these examples are not intended to be limiting and computing device 202 may include other types of devices other than those listed herein.

As further shown in FIG. 2, computing device 100 comprises a browser process 208, which is an example of process(es) 108, operating system 106 comprises a registry 212, and information falsifier 110 comprises a monitor 204 a falsifier process 206, and an exception handler 214. Computing device 202 is configured to host a website 210. In the example shown in FIG. 2, website 210 is a malicious website configured to inject shellcode into a browser process executing on a computing device that accesses website 210.

Browser process 208 may be configured to access a website (e.g., website 210). A user may interact with browser process 208 to cause browser process 208 to traverse a network address (e.g., a uniform resource locator) corresponding to website 210. To access website 210, browser process 208 may provide an HTTP request message 201 to computing device 202. HTTP request 201 may include information that specifies a type, a version, and/or other identifier(s) of browser process 208 and/or operating system 106. Such information may be provided, for example and without limitation, within a header field of HTTP request 201 (e.g., a User-Agent header). For example, the information may specify a name of browser process 208 (e.g., Microsoft Edge®, Mozilla Firefox®, Google Chrome®), a version number thereof, and/or a name of operating system 106 (e.g., Microsoft Windows®, Mac OS®, etc.), and a version thereof. Browser process 208 may retrieve the information from registry 212 and populate the t header field with the retrieved information.

Registry 212 may comprise a hierarchical database that stores low-level settings for operating system 106 and/or process(es), such as browser process 208. In particular, registry 212 may contain information, settings, options, and/or other values for operating system 106 and processe(s) installed on computing device 100 that are managed by operating system 106. The information, settings, options, and/or other values may be stored as keys and/or subkeys, which contain settings such as a process's location, its version, etc. Browser process 208 may issue a query 203 to registry 212 to retrieve the information. Query 203 may comprise one or more procedure calls (e.g., registry function application programming interface (API) calls). Examples of such procedure call(s) include, but are not limited to, a QueryStringValue procedure call, a RegGetValue procedure call, etc., each of which are procedure calls used in a Microsoft Windows®-based operating system. In response to receiving query 203, registry 212 may provide a response 205 to browser process 208 that includes the requested information, and browser process 208 may include the information in HTTP request 201.

Website 210 may use this information to provide content that is tailored for the identified browser process and/or operating system 106. A malicious website may use this information to determine vulnerabilit(ies) of browser process 208 and/or operating system 106 and inject shellcode into browser process 208. The shellcode is configured for execution in accordance with a type and/or version of operating system 106 and/or browser process 208 and/or other characteristics of computing device 100. For example, if the information specifies that computing device 100 is executing a 32-bit version of Microsoft Windows®, the malicious website may inject shellcode that is configured to be executed by a 32-bit processor and that is configured to exploit vulnerabilit(ies) of that version of Microsoft Windows®.

To prevent the shellcode from executing properly, information falsifier 110 may cause an HTTP request that includes inaccurate information to be provided to website 210. For example, monitor 204 of information falsifier 110 may be configured to monitor registry 212 for procedure call(s) directed thereto and detect that procedure call(s) are issued from browser process 208 to registry 212. In accordance with an embodiment, monitor 204 may use hooking techniques to hook procedure calls (e.g., a QueryStringValue procedure call, a RegGetValue procedure call, etc.) directed to registry 212.

Upon hooking the procedure call(s), monitor 204 may retrieve the information from registry 212 and provide the information (shown as information 207) to falsifier process 206. Falsifier process 206 may replace one or more portions of information 207 with information that falsely identifies browser process 208 and/or operating system 106. For example, if information 207 indicates that browser process 208 is Mozilla Firefox® and/or operating system 106 is Microsoft Windows 10™, falsifier process 206 may change the information to falsely identify browser process 208 as being Microsoft Edge® and/or falsely identify operation system 106 as being Ubuntu 17.10. It is noted that the usage of hooking techniques is a non-limiting example and that various other techniques may be used to monitor for queries.

In accordance with an embodiment, falsifier process 206 may generate an HTTP request 213 that includes the false information (e.g., in its User-Agent header) and provide HTTP request 213 to website 210. In accordance with another embodiment, falsifier process 206 may include the false information in response 205 that is provided to browser process 208. In accordance with yet another embodiment, falsifier process 206 may change the appropriate registry values to reflect the false information, and browser process 208 may retrieve the false information from registry 212.

In addition to or in lieu of determining information regarding browser 208 and/or operating system 106 via an HTTP request, website 210 may provide code 209 (e.g., JavaScript) to browser process 208 that, when executed by browser process 208, obtains information regarding browser process 208 and/or operating system 106. Code 209 may be provided to browser process 208 responsive to receiving HTTP request 201. Code 209 may access one or more navigator objects of browser process 208 that provides the information. Examples of such navigator objects, include, but are not limited to a navigator.userAgent (which returns the information typically provided via the User-Agent header described above), navigator.appversion, navigator.appName, etc. When such objects are accessed, a query (e.g., query 203) is sent to registry 212 to retrieve the requested information, the information is provided to browser process via response 205, and browser process 208 provides the information (shown as information 211) to website 210. As described above, monitor 204 may hook query 203, obtain the information (i.e., information 207) requested by query 203 from registry 212, and provide information 207 to falsifier process 206. Falsifier process 206 may replace portion(s) of information 207 with information that falsely identifies browser process 208 and/or operating system 106 and causes browser process 208 to provide the falsified information (information 211) to website 210.

In accordance with an embodiment, falsifier process 206 may include the false information in response 205 that is provided to browser process 206. In accordance with another embodiment, falsifier process 206 may change the appropriate registry values to reflect the false information, and browser process 208 may retrieve the false information from registry 212.

Upon receiving the information, website 210 may use this information to determine vulnerabilit(ies) of browser process 208 and/or operating system 106 and inject shellcode (e.g., shellcode 216) into browser process 208. Shellcode 216 is configured to be executed in accordance with the type and/or version of operating system 106, browser process 208, and/or other characteristics of computing device 100 that is specified by the false information provided thereto. In other words, the wrong version of shellcode 216 may be injected into browser process 208. For example, if the information specifies that browser process 208 is Microsoft Edge®, but in actuality, browser process 208 is Google Chrome®, shellcode 216 would be configured for execution by Microsoft Edge®. When shellcode 216 attempts to execute, browser process 208 may throw an exception 215 indicating that execution of shellcode 216 has failed due to shellcode 216 being incompatible with browser process 208 and/or operating system 106 (i.e., an incompatible code exception is thrown). In another example, if the information specifies that operating system 106 is a 32-bit version of Microsoft Windows®, but in actuality, operating system 106 is a 64-bit version of Microsoft Windows®, shellcode 216 would be configured for execution by a 32-bit instruction set instead of 64-bit instruction set. In another example, if the information specifies that operating system 106 is Microsoft Windows®, but in actuality, operating system 106 is a Linux®-based operating system, shellcode 216 would be configured for execution by Microsoft Windows® instead of the Linux-based operating system.

Exception handler 214 detects exception 215 and may cause operating system 106 to perform one or more operations to neutralize the shellcode 216. For example, exception handler 214 may cause operating system 106 to terminate shellcode 216, suspend shellcode 216, record to an event log an event that indicates that shellcode 216 attempted execution, prompt a user of the computing device (e.g., computing device 100) to specify an operation to perform, and/or activate an anti-virus program or other security mechanism that is configured to neutralize the malicious process.

The aforementioned providing of false information may prevent a user from downloading platform-specific files, such as a binary executable via website 210. In accordance with one or more embodiments, browser process 208 may enable the user to download such files. For example, when a user attempts to download such files via browser process 208, browser process 208 may warn the user that the false information provided to website 210 is preventing the file from being downloaded. Browser process 208 may also prompt the user with one or more option(s) that enable the user to override the false information. For example, the user may specify that browser process 208 provide the correct information (e.g., the correct operating system type and/or version) to browser process 208, thereby enabling the user to download the platform-specific file.

In accordance with one or more embodiments, browser process 208 may be configured to only provide the false information to certain websites (e.g., websites that known to be suspicious, while other websites that are known to be safe (e.g., websites that implement secure sockets layer (SSL) certificates) are provided with the correct information. For example, browser process 208 may maintain a whitelist of websites that are known to be safe and a blacklist of websites that are known to be suspicious. Browser process 208 may reference these lists to determine whether to provide false information or correct information to the website.

Figure 3:
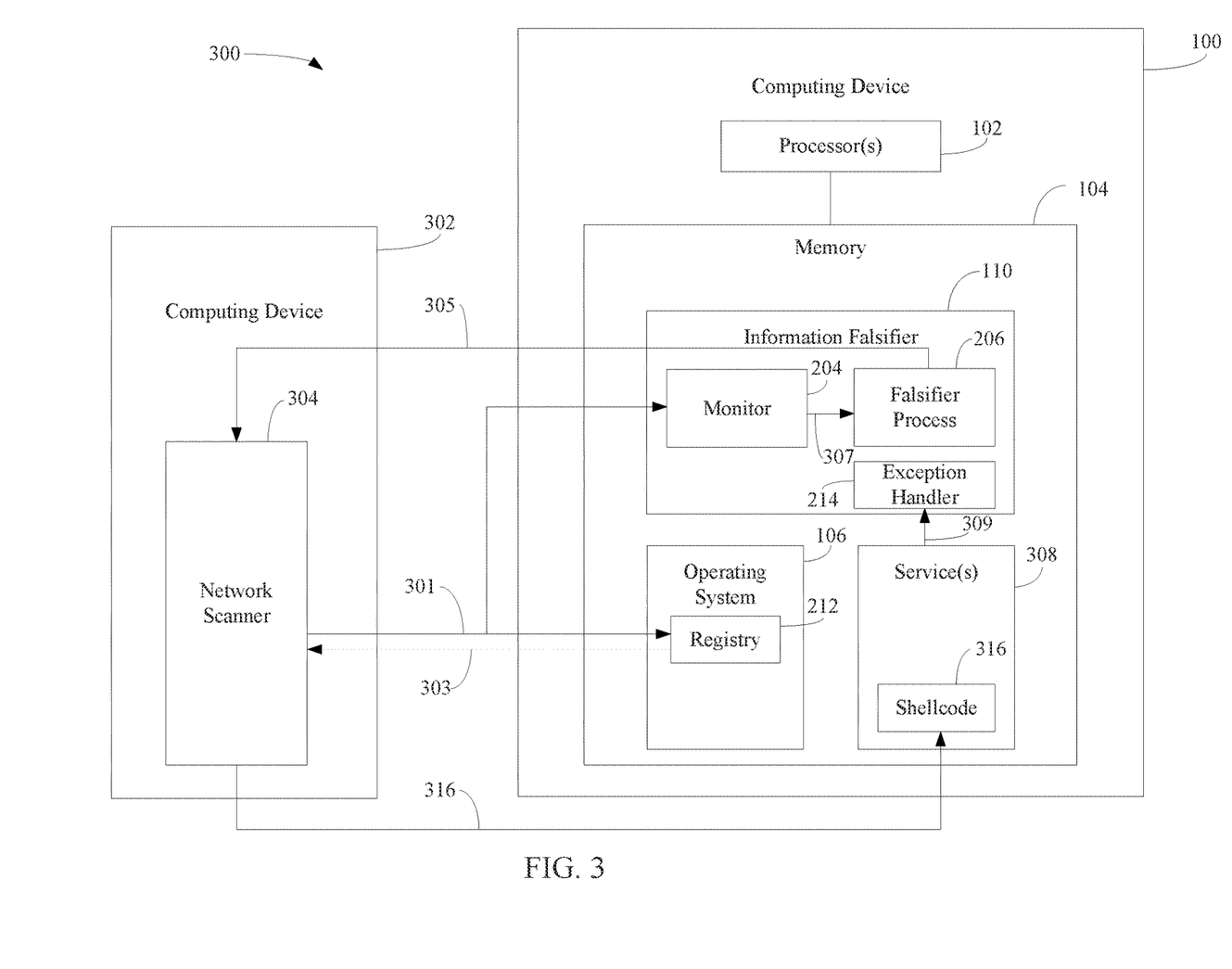
FIG. 3 shows a block diagram of an example system for falsifying information requested by a network scanner in accordance with an example embodiment.

FIG. 3 shows a block diagram of an example system 300 for falsifying information requested by a network scanner 304, according to an example embodiment. As shown in FIG. 3, system 300 comprises computing device 100 (as described above with reference to FIGS. 1 and 2) and computing device 302. Computing device 302 may be any type of stationary or mobile computing device, including a desktop computer (e.g., a personal computer, etc.), a mobile computer or computing device (e.g., a Palm® device, a RIM Blackberry® device, a personal digital assistant (PDA), a laptop computer, a notebook computer, a tablet computer (e.g., an Apple iPad™), a smart phone (e.g., an Apple iPhone, a Google Android™ phone, a Microsoft Windows® phone, etc.), a wearable computing device, an IoT computing device, or other type of computing device. However, these examples are not intended to be limiting and computing device 302 may include other types of devices other than those listed herein.

As further shown in FIG. 3, computing device 100 comprises one or more services(s) 308, which are examples of process(es) 108. Examples of service(s) 308, include, but are not limited to, directory services, file sharing services, instant message services, printing services, file services, etc. Computing device 302 is configured execute network scanner 304. Network scanner 304 may be one or more computer applications executing on computing device 302 that are configured to perform a port scan and inject shellcode into vulnerable service(s) 308. A port scan is process that sends requests to a range of ports (which are used by service(s) 308 and/or other components of operating system 106) on a host, for example, computing device 100, in order to determine which ports are open. Network scanner 304 may provide requests to various open ports to obtain information about computing device 100. For example, network scanner 304 may determine a type and/or version of operating system 106 installed on computing device 100, a type and/or version of service(s) 308 installed and/or executing on computing device 100, other process(es) installed and/or executing on computing device 100, and/or other characteristics of computing device 100. Network scanner 304 may obtain the information by scanning one or more ports used by registry 212, sending a query 301 to registry 212 via the opened port(s) and receiving a response 303 from registry 212 including the requested information. Upon determining the information of computing device 100, network scanner 304 may inject shellcode into a process of a service that utilizes an open port. The shellcode is configured to be executed in accordance with the type and/or version of operating system 106 and/or service(s) 308 and/or other characteristics of computing device 100 that are specified by the obtained information.

To prevent the shellcode from executing properly, information falsifier 110 may provide inaccurate information to network scanner 304. For example, monitor 204 of information falsifier 110 may monitor registry 212 for a query (e.g., query 301) issued from network scanner 302 and directed to registry 212. Query 301 may comprise procedure call(s) configured to read information from registry 212. In accordance with an embodiment, monitor 204 may use hooking techniques to hook procedure calls directed to registry 212. Examples of procedure calls that may be hooked include, but are not limited to, a QueryStringValue procedure call, a RegGetValue procedure call, etc., each of which are procedure calls used in a Microsoft Windows®-based operating system.

Upon hooking the procedure call(s), monitor 204 may retrieve the requested information from registry 212 and provide the information (shown as information 307) to falsifier process 206. Falsifier process 206 may replace portion(s) of information 307 with information that falsely identifies operating system 106 and/or service(s) 308. It is noted that the usage of hooking techniques is a non-limiting example and that various other techniques may be used to monitor for queries.

In accordance with an embodiment, falsifier process 206 provides the falsified information (shown as falsified information 305) to network scanner 304. In accordance with another embodiment, falsifier process 206 may include the false information in response 303 that is provided to network scanner 304. In accordance with yet another embodiment, falsifier process 206 may change the appropriate registry values to reflect the false information, and network scanner 304 may retrieve the false information from registry 212.

Upon receiving the information from computing device 100, network scanner 304 may use this information to determine vulnerabilit(ies) of operating system 106 and/or service(s) 308 and inject shellcode (e.g., shellcode 316) into a process of service(s) 308. For example, network scanner 304 may inject shellcode 316 via an open port utilized by service(s) 308. Shellcode is configured to be executed in accordance with the type and/or version of operating system 106 and/or service(s) 308 and/or other characteristics of computing device 100 that are specified by falsified information 305. In other words, the wrong version of shellcode 316 may be injected into service(s) 308. When shellcode 316 attempts to execute, service(s) 308 may throw an exception 309 indicating that execution of shellcode 316 has failed due to shellcode 316 being incompatible with operating system 106 and/or process 308 (i.e., an incompatible code exception is thrown). Exception handler 214 may detect exception 309 and may cause operating system 106 to perform one or more operations to neutralize shellcode 316. For example, exception handler 214 may cause operating system 106 to terminate shellcode 316, suspend shellcode 316, record an event in an event log that indicates that shellcode 316 attempted execution, prompt a user of the computing device (e.g., computing device 100) to indicate an operation to perform, and/or activate an anti-virus program or other security mechanism that is configured to neutralize the malicious process.

Figure 4:
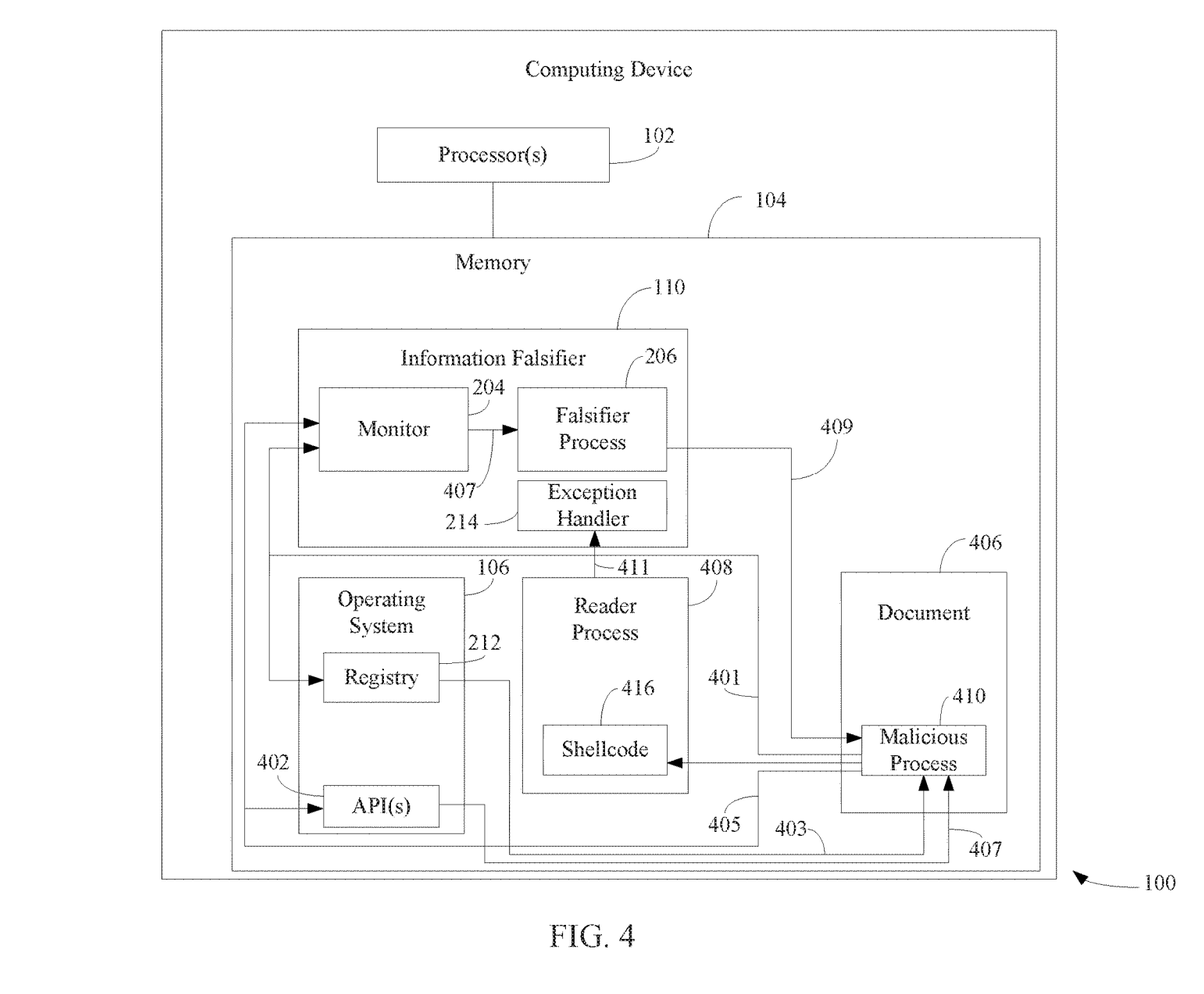
FIG. 4 shows a block diagram of a computing device configured to falsify information requested by a local process in accordance with another embodiment.

FIG. 4 shows a block diagram of a computing device (e.g., computing device 100) configured to falsify information requested by a local process, according to an example embodiment. As shown in FIG. 4, computing device 100 comprises a reader process 408, which is an example of process(es) 108. Reader process 408 may be any software application configured to open, view, create, manipulate, print and/or manage one or more documents (e.g., document 406) stored in memory 104. Examples of such a software application include, but are not limited to, Microsoft Word®, Microsoft PowerPoint®, Microsoft Excel® Adobe Acrobat®, etc.

Document 406 may comprise a malicious process 410, such as a macro virus, embedded therein. When document 406 is opened by reader process 408, malicious process 410 may execute a series of commands and/or actions to obtain information regarding reader process 408 and/or operating system 106. For example, malicious process 410 may send a query 401 to registry 212 to obtain information regarding operating system 106 and reader process 408. Query 401 may comprise one or more procedure calls (e.g., registry function application programming interface (API) calls). Examples of such procedure call(s) include, but are not limited to, a QueryStringValue procedure call, a RegGetValue procedure call, etc., each of which are procedure calls used in a Microsoft Windows®-based operating system. Registry 212 may provide a response 403 that includes the requested information. In addition to or in lieu of sending query 401, malicious process 410 may send a query 405 to one or more APIs 402 exposed by operating system 106. APIs 402 are configured to provide information (via a response 407) regarding operating system 106. Query 405 may comprise one or more API procedure calls configured to be received by API(s) 402. Examples of such procedure calls include, but are not limited to, a GetVersion procedure call, a VerifyVersion procedure call, etc., each of which are procedure calls used in a Microsoft Windows®-based operating system.

The information included in response 403 and/or 407 may include a type and/or version of operating system 106, a type and/or version of reader process 408, other process(es) installed and/or executing on computing device 100, and/or other characteristics of computing device 100. Upon determining the information, malicious process 410 may inject shellcode into reader process 408. The shellcode is configured to be executed in accordance with the type and/or version of operating system 106 and/or reader process 408 and/or other characteristics of computing device 100 that are specified by the obtained information.

To prevent the shellcode from executing properly, information falsifier 110 may provide inaccurate information to malicious process 410. For example, monitor 204 of information falsifier 110 may be configured to monitor registry 212 and/or API(s) for a quer(ies) thereto (e.g., query 401 and/or query 403) issued from malicious process 410. In accordance with an embodiment, monitor 204 may use hooking techniques to hook procedure call(s) that comprise query 401 and/or query 403.

Upon hooking the procedure call(s), monitor 204 may retrieve the requested information from registry 212 and/or API(s) 402 and provide the information (shown as information 407) to falsifier process 206. Falsifier process 206 may replace portion(s) of information 407 with information that falsely identifies operating system 106, reader process 408, and/or other process(es) executing on computing device 100. It is noted that the usage of hooking techniques is a non-limiting example and that various other techniques may be used to monitor for queries.

In accordance with an embodiment, falsifier process 206 may provide the falsified information (shown as falsified information 409) to malicious process 410. In accordance with another embodiment, falsifier process 206 may change the appropriate registry values to reflect the false information, and malicious process 410 retrieves the false information from registry 212.

Upon receiving the information from computing device 100, malicious process 410 executing on computing 306 may use this information to determine vulnerabilit(ies) of operating system 106, reader process 408 and/or other process(es) installed and/or executed on computing device 1000 and inject shellcode (e.g., shellcode 416) into reader process 404. Shellcode 316 is configured to be executed in accordance with the type and/or version of operating system 106 and/or a reader process 408 and/or other characteristics of computing device 100 that are specified by the false information obtained by malicious process 410. In other words, the wrong version of shellcode 416 is injected into reader process 408. When shellcode 416 attempts to execute, reader process 408 may throw an exception 411 indicating that execution of shellcode 416 has failed due to shellcode 416 being incompatible with operating system 106 and/or reader process 408 (i.e., an incompatible code exception is thrown). Exception handler 214 may detect exception 411 and may cause operating system 106 to perform one or more operations to neutralize shellcode 416. For example, exception handler 214 may cause operating system 106 to terminate shellcode 416, suspend shellcode 416, record an event to an event log that indicates that shellcode 416 attempted execution, prompt a user of the computing device (e.g., computing device 100) to specify an operation to perform, and/or activate an anti-virus program or other security mechanism that is configured to neutralize the malicious process.

Figure 5:
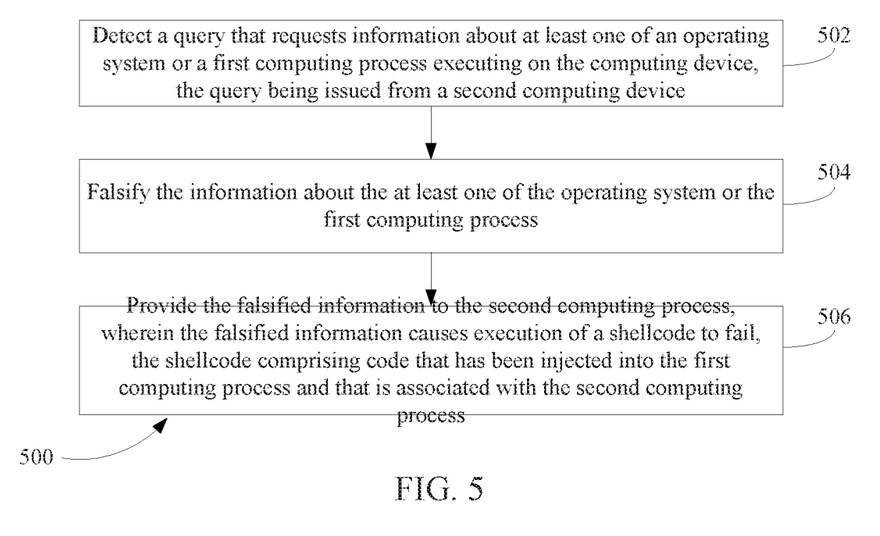
FIG. 5 depicts a flowchart of an example method for falsifying information provided to a malicious process in accordance with an embodiment.

Accordingly, information falsifier 110 may be configured to cause shellcode to fail execution in many ways. For example, FIG. 5 depicts a flowchart 500 of an example method for falsifying information provided to a malicious process, according to an example embodiment. Information falsifier 110 shown in FIGS. 1-4 may operate according to flowchart 500. For illustrative purposes, flowchart 500 is described with continued reference to FIGS. 2-4. Flowchart 500 and information falsifier 110 are described as follows.

Flowchart 500 begins with step 502. At step 502, a query that requests information about at least one of an operating system or a first computing process executing on a computing device is detected, the query being issued from a second computing device. For example, as shown in FIG. 2, monitor 204 detects a query 203 originating from website 210 for information about at least one of operating system 106 or browser process 208 executing on computing device 100. As shown in FIG. 3, monitor 204 detects a query 301 from network scanner 304 for information about at least one of operating system 106 or service(s) 308 executing on computing device 100. As shown in FIG. 4, monitor 204 detects a query 401 or query 403 from malicious process 410 for information about at least one of operating system 106 or reader process 408 executing on computing device 100.

In accordance with one or more embodiment, the information comprises at least one of a type of the at least one of the operating system or the first computing process, a version of the at least one of the operating system or the first computing process, or an identifier of the at least one of the operating system or the first computing process.

In accordance with one or more embodiments, the second computing process comprises at least one of malicious website (e.g., website 210), a network scanner (e.g., network scanner 304), or a malicious macro (e.g., malicious process 410).

In accordance with one or more embodiments, the detecting step comprises hooking a procedure call issued from the second computing process that requests the information.

At 504, the information associated with at least one of the operating system or the first computing process is falsified. For example, with reference to FIGS. 2-4, falsifier process 206 is configured to falsify the information associated with at least one of operating system 106, browser process 208, service(s) 308, or reader process 408.

At step 506, the falsified information is provided to the second computing process, wherein the falsified information causes execution of a shellcode injected into the first computing process and that is associated with the second computing process to fail. For example, with reference to FIGS. 2-4, falsifier process 206 provides the falsified information to website 210, network scanner 304, or malicious process 410. As shown in FIG. 2, website 210 may inject shellcode 216 into browser process 208 that fails upon execution (e.g., via processor(s) 102, as shown in FIG. 1). As shown in FIG. 3, network scanner 304 may inject shellcode 316 into service(s) 308 that fails upon execution. As shown in FIG. 4, malicious process 410 may inject shellcode 416 into reader process 408 that fails upon execution.

In accordance with one or more embodiments, execution of the shellcode causes an exception to be thrown by the first computing process. Detection of the exception may enable the shellcode to be neutralized.

Figure 6:
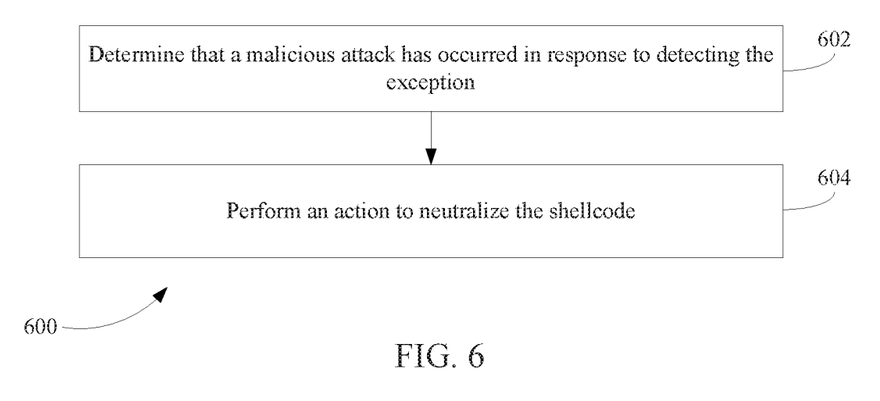
FIG. 6 depicts a flowchart of an example method for neutralizing shellcode in accordance with another embodiment.

For example, FIG. 6 depicts a flowchart 600 of an example method for neutralizing shellcode, according to an example embodiment. Information falsifier 110 shown in FIGS. 2-4 may operate according to flowchart 600. For illustrative purposes, flowchart 600 is described with continued reference to FIGS. 2-4. Flowchart 600 and information falsifier 110 are described as follows.

Flowchart 500 begins with step 502. At step 502, a determination is made that a malicious attack has occurred in response to detecting the exception. For example, with reference to FIGS. 2-4, exception handler 214 may detect an exception (e.g., exception 215, as shown in FIG. 2, exception 309, as shown in FIG. 4, or exception 411, as shown in FIG. 4).

At step 504, an action is performed to neutralize the shellcode. For example, exception handler 214 may cause operating system 106 to perform an action to neutralize shellcode 216, shellcode 316, or shellcode 416.

In accordance with one or more embodiments, the action comprises terminating the shellcode, suspending the shellcode, activating an anti-virus program, recording to an event log an event that indicates that the shellcode attempted execution, or prompting a user of the computing device to specify an operation to perform.

It is noted that the foregoing techniques for protecting a computer device from malicious code injection may be used for any type of injection-based attacks, and such techniques are not limited to the types of injection-based attacks described above. It is further noted that the foregoing techniques can be further extended to protecting a computing device from other forms of malware, including, but not limited to, viruses, worms, Trojan horses, and/or the like.

IV. Example Computer System Implementation

Figure 7:
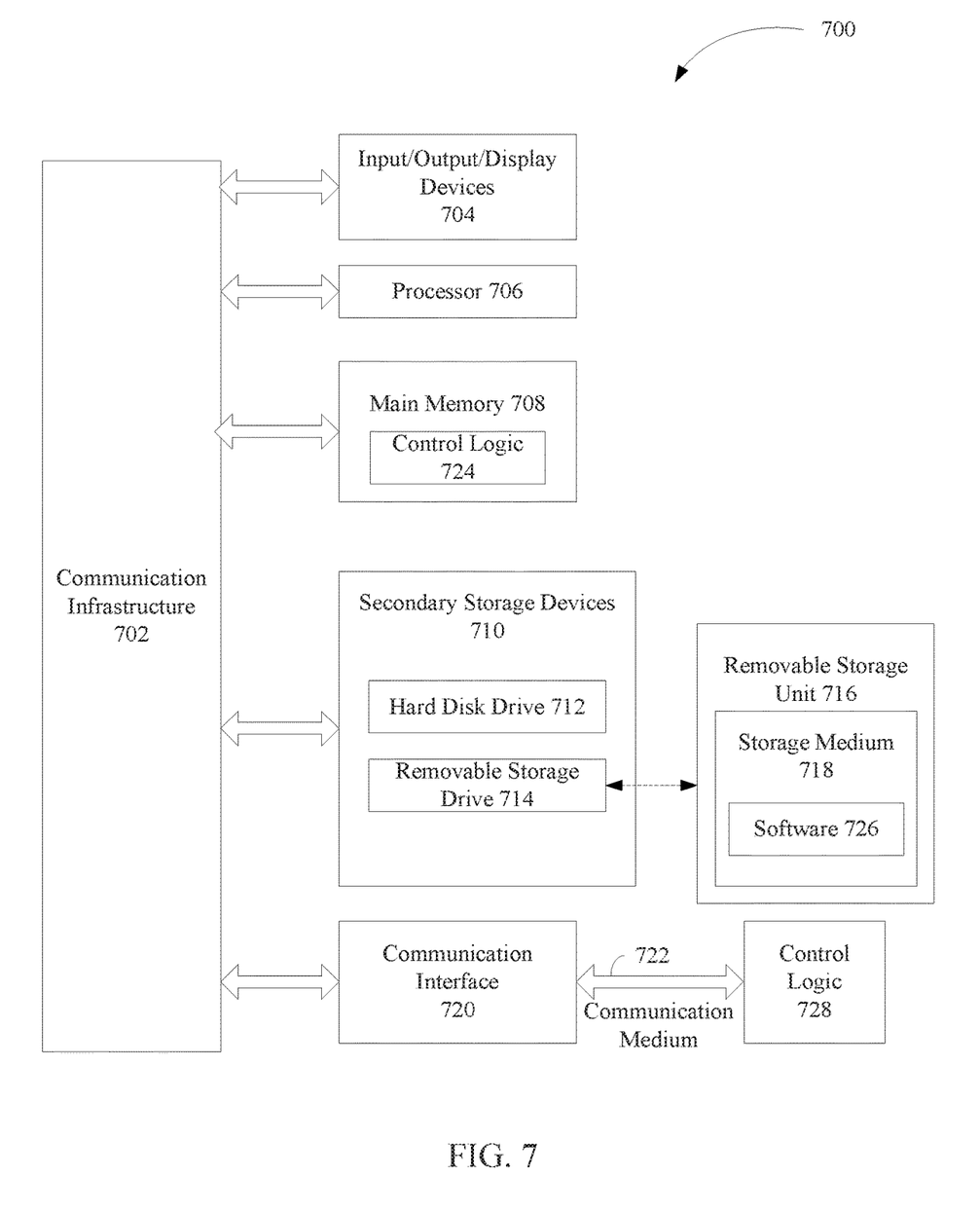
FIG. 7 depicts a block diagram of a computer system that may be configured to perform one or more techniques disclosed herein.

The embodiments described herein, including systems, methods/processes, and/or apparatuses, may be implemented using well known processing devices, telephones (land line based telephones, conference phone terminals, smart phones and/or mobile phones), interactive television, servers, and/or, computers, such as a computer 700 shown in FIG. 7. It should be noted that computer 700 may represent computing devices linked to, processing devices, traditional computers, and/or the like in one or more embodiments. For example, computing device 100 of FIGS. 1-4, computing device 202 of FIG. 2, and computing device 302 of FIG. 3, and any of the sub-systems, components, and/or models respectively contained therein and/or associated therewith, may be implemented using one or more computers 700.

Computer 700 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 700 may be any type of computer, including a desktop computer, a server, etc.

Computer 700 includes one or more processors (also called central processing units, or CPUs), such as a processor 706. Processor 706 is connected to a communication infrastructure 702, such as a communication bus. In some embodiments, processor 706 can simultaneously operate multiple computing threads, and in some embodiments, processor 706 may comprise one or more processors.

Computer 700 also includes a primary or main memory 708, such as random access memory (RAM). Main memory 908 has stored therein control logic 724 (computer software), and data.

Computer 700 also includes one or more secondary storage devices 710. Secondary storage devices 710 include, for example, a hard disk drive 712 and/or a removable storage device or drive 714, as well as other types of storage devices, such as memory cards and memory sticks. For instance, computer 700 may include an industry standard interface, such a universal serial bus (USB) interface for interfacing with devices such as a memory stick. Removable storage drive 714 represents a floppy disk drive, a magnetic tape drive, a compact disk drive, an optical storage device, tape backup, etc.

Removable storage drive 714 interacts with a removable storage unit 716. Removable storage unit 716 includes a computer useable or readable storage medium 718 having stored therein computer software 726 (control logic) and/or data. Removable storage unit 716 represents a floppy disk, magnetic tape, compact disk, DVD, optical storage disk, or any other computer data storage device. Removable storage drive 714 reads from and/or writes to removable storage unit 716 in a well-known manner.

Computer 700 also includes input/output/display devices 704, such as touchscreens, LED and LCD displays, monitors, keyboards, pointing devices, etc.

Computer 700 further includes a communication or network interface 720. Communication interface 720 enables computer 700 to communicate with remote devices. For example, communication interface 720 allows computer 700 to communicate over communication networks or mediums 722 (representing a form of a computer useable or readable medium), such as LANs, WANs, the Internet, etc. Network interface 720 may interface with remote sites or networks via wired or wireless connections.

Control logic 728 may be transmitted to and from computer 900 via the communication medium 722.

Any apparatus or manufacture comprising a computer useable or readable medium having control logic (software) stored therein is referred to herein as a computer program product or program storage device. This includes, but is not limited to, computer 700, main memory 708, secondary storage devices 710, and removable storage unit 716. Such computer program products, having control logic stored therein that, when executed by one or more data processing devices, cause such data processing devices to operate as described herein, represent embodiments.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media and signals transmitted over wired media. Embodiments are also directed to such communication media.

The techniques and embodiments described herein may be implemented as, or in, various types of devices. For instance, embodiments may be included in mobile devices such as laptop computers, handheld devices such as mobile phones (e.g., cellular and smart phones), handheld computers, and further types of mobile devices, desktop and/or server computers. A device, as defined herein, is a machine or manufacture as defined by 35 U.S.C. § 101. Devices may include digital circuits, analog circuits, or a combination thereof. Devices may include one or more processor circuits (e.g., central processing units (CPUs) (e.g., processor 906 of FIG. 9), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for protecting a computing device from shellcode injection and execution, comprising:
    detecting a query that requests information about at least one of an operating system or a first computing process executing on the computing device, the query being issued from a second computing process;
    falsifying the information about the at least one of the operating system or the first computing process; and
    providing the falsified information to the second computing process, wherein the falsified information causes execution of a shellcode to fail, the shellcode comprising code that has been injected into the first computing process and that is associated with the second computing process.

2. The method of claim 1, wherein the information comprises at least one of:
    a type of the at least one of the operating system or the first computing process;
    a version of the at least one of the operating system or the first computing process; or
    an identifier of the at least one of the operating system or the first computing process.

3. The method of claim 1, wherein the second computing process comprises at least one of:
    a malicious website;
    a network scanner; or
    a malicious macro.

4. The method of claim 1, wherein the detecting step comprises:
    hooking a procedure call issued from the second computing process that requests the information.

5. The method of claim 1, wherein execution of the shellcode causes an exception to be thrown by the first computing device.

6. The method of claim 5, further comprising:
    determining that a malicious attack has occurred in response to detecting the exception; and
    performing an action to neutralize the shellcode.

7. The method of claim 6, wherein the performing step comprises:
    terminating the shellcode;
    suspending the shellcode;
    activating an anti-virus program;
    recording to an event log an event that indicates that the shellcode attempted execution; or
    prompting a user of the computing device to specify an operation to perform.

8. A system, comprising:
    one or more processors; and
    a memory coupled to the one or more processors, the memory storing instructions, which, when executed by the one or more processors, cause the one or more processors to perform operations, the operations comprising:
        detecting a query that requests information about at least one of an operating system or a first computing process executing on the computing device, the query being issued from a second computing process;
        falsifying the information about the at least one of the operating system or the first computing process; and
        providing the falsified information to the second computing process, wherein the falsified information causes execution of a shellcode to fail, the shellcode comprising code that has been injected into the first computing process and that is associated with the second computing process.

9. The system of claim 8, wherein the information comprises at least one of:
    a type of the at least one of the operating system or the first computing process;
    a version of the at least one of the operating system or the first computing process; or
    an identifier of the at least one of the operating system or the first computing process.

10. The system of claim 8, wherein the second computing process comprises at least one of:
    a malicious website;
    a network scanner; or
    a malicious macro.

11. The system of claim 8, wherein the detecting step comprises:
    hooking a procedure call issued from the second computing process that requests the information.

12. The system of claim 8, wherein execution of the shellcode causes an exception to be thrown by the first computing device.

13. The system of claim 12, the operations further comprising:
    determining that a malicious attack has occurred in response to detecting the exception; and
    performing an action to neutralize the shellcode.

14. The system of claim 13, wherein the performing step comprises:
    terminating the shellcode;
    suspending the shellcode;
    activating an anti-virus program;
    recording to an event log an event that indicates that the shellcode attempted execution; or
    prompting a user of the computing device to specify an operation to perform.

15. A computer-readable storage medium having program instructions recorded thereon that, when executed by a processing device, perform a method for protecting a computing device from shellcode injection and execution, the method comprising:
    detecting a query that requests information about at least one of an operating system or a first computing process executing on the computing device, the query being issued from a second computing process;
    falsifying the information about the at least one of the operating system or the first computing process; and
    providing the falsified information to the second computing process, wherein the falsified information causes execution of a shellcode to fail, the shellcode comprising code that has been injected into the first computing process and that is associated with the second computing process.

16. The computer-readable storage medium of claim 15, wherein the information comprises at least one of:
    a type of the at least one of the operating system or the first computing process;

a version of the at least one of the operating system or the first computing process; or an identifier of the at least one of the operating system or the first computing process.

17. The computer-readable storage medium of claim 15, wherein the second computing process comprises at least one of:
  a malicious website;
  a network scanner; or
  a malicious macro.

18. The computer-readable storage medium of claim 15, wherein the detecting step comprises:
  hooking a procedure call issued from the second computing process that requests the information.

19. The computer-readable storage medium of claim 15, wherein execution of the shellcode causes an exception to be thrown by the first computing device.

20. The computer-readable storage medium of claim 19, wherein the method further comprises:
  determining that a malicious attack has occurred in response to detecting the exception; and
  performing an action to neutralize the shellcode.

\* \* \* \* \*